Feb. 9, 1943.  G. ELLIS  2,310,845
METHOD OF DETERMINING THE MAGNITUDE OF STRAINS IN RIGID ARTICLES
Filed Oct. 3, 1940  2 Sheets-Sheet 1
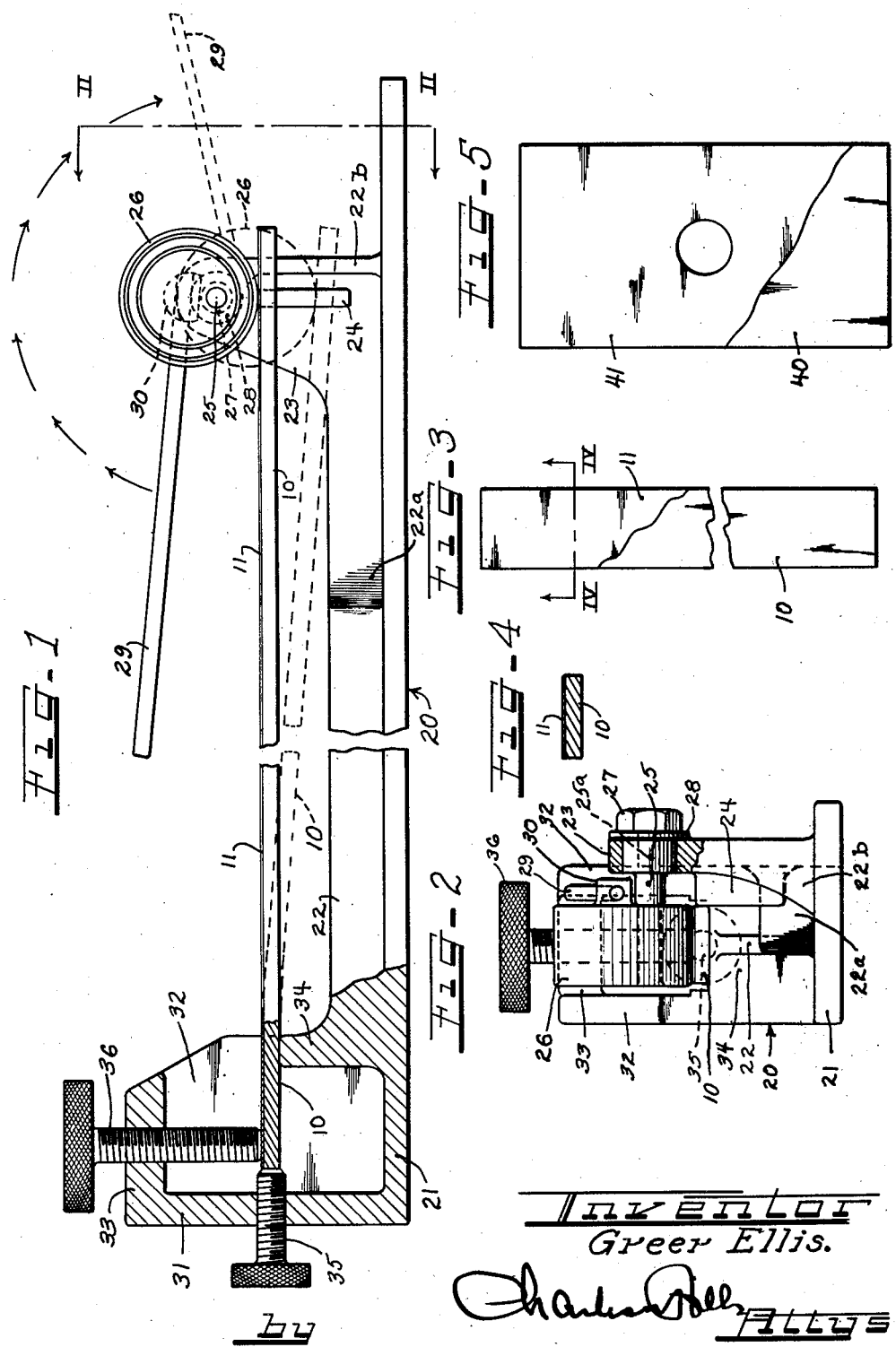
Inventor
Greer Ellis.
by Charles Ellis
Attys

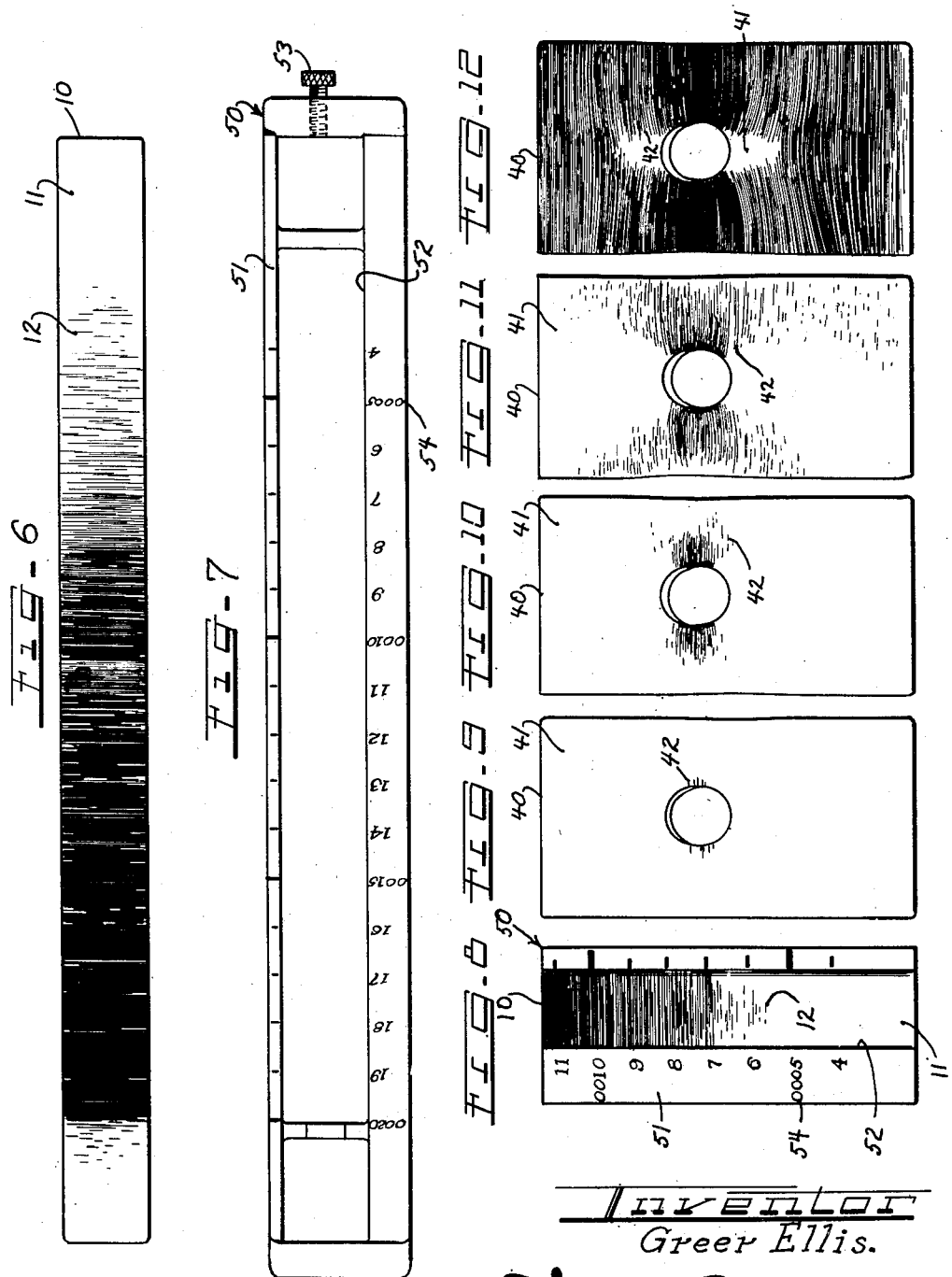

Patented Feb. 9, 1943

2,310,845

UNITED STATES PATENT OFFICE 2,310,845

METHOD OF DETERMINING THE MAGNITUDE OF STRAINS IN RIGID ARTICLES

Greer Ellis, Cambridge, Mass., assignor to Magnaflux Corporation, Chicago, Ill., a corporation of Delaware Application October 3, 1940, Serial No. 359,607

8 Claims. (Cl. 73—51)

This invention relates to a method for determining the magnitude of strains in rigid articles by means of continuous adherent uniformly brittle films. More particularly, the invention pertains to scales for reading off directly the absolute strain value in any area of a stressed rigid article.

Methods of determining the strain concentration in rigid articles and compositions therefor have been described in my applications for Patent Nos. 239,338, 277,448 and 351,221, filed, respectively, November 7, 1938, June 5, 1939, and August 3, 1940, of all of which the present application is a continuation-in-part. As disclosed in my filed applications, strain concentration in rigid articles may be determined by a method including coating a rigid article with a continuous adherent brittle film that will crack uniformly at the same stress value regardless of local variations in thickness. An article thus coated is subjected to increasing known loads, when the coating film will crack initially over the most highly strained area of the coated rigid article and subsequently over areas of lower strain concentration, as the load is increased. The strain concentration in the different areas is inversely proportional to the magnitude of the loads required to form a full crack pattern over said areas.

The cracking characteristics of the brittle films disclosed in my pending applications vary according to temperature and moisture conditions, so that even in the case of identical films no single typical crack pattern can be said to be characteristic of any one stress value. For this reason, the values obtained by methods using brittle films exclusively have heretofore been confined to values that express the relative stress concentration in various areas in a rigid article being tested. Absolute values are not obtained directly, although obtainable by computation or by a calibration of any one brittle film by a mechanical strain gage. This calibration is of course valid only for a specific set of temperature and moisture conditions.

I have now found that direct quantitative evaluation of the absolute magnitude of strains may be secured by coating the article to be tested and a standardized member with identical continuous adherent uniformly brittle films at the same time and under the same temperature and moisture conditions. When the coated article to be tested is subjected to increasing loads in the manner disclosed in my filed applications, the coated strip is at the same time deformed resiliently to effect in the film thereon standardized known stresses that increase progressively along the length of the standardized member. Crack patterns are then formed on the coated member that vary characteristically in accordance with the magnitude of the stresses in the various parts of the coated member. These stresses being known, numerical indicia indicating the magnitudes of the stresses may be provided along the length of the standardized member, so that by matching the strain pattern in any area of the article being tested with a crack pattern in the standardized member, the absolute value of the stress in that area of the article may be read off directly on the scale of increasing stresses formed by said indicia.

It is therefore an important object of the present invention to provide simple means and methods for calibrating, in terms of absolute stress values, the brittleness, under given temperature and moisture conditions, of continuous adherent brittle films that crack at stress values independent of local variations in film thickness.

Another important object of this invention is to provide means and methods for subjecting a film, as described hereinabove coating an elongated resilient member of standardized dimensions, simultaneously to progressively increasing known stresses that are distributed over successive contiguous areas of said coating.

A further object of the invention is to provide a method for determining directly the strain concentration in rigid articles by means of scales that provide a series of different crack patterns characteristic of progressively greater stresses as well as numerical indicia indicating the absolute magnitude of the stresses effecting each of said crack patterns.

A further object of the invention is to provide scales for reading off directly absolute strain values in rigid articles as indicated by cracks in uniformly brittle films coating said article by matching patterns formed by said cracks with crack patterns on said scale.

A further object is to provide methods of making scales showing typical crack patterns and provided with numerical indicia indicating the magnitudes of the stresses effecting each pattern.

Other and further objects of this invention will become apparent to those skilled in the art from the following description and appended drawings, which show preferred forms of the present invention.

On the drawings:

Figure 1 shows a fragmentary side elevational view, with certain parts shown in longitudinal cross section, of a device for subjecting a standardized steel bar (also shown) to predetermined stresses.

Figure 2 is an end elevational view of the device and bar shown in Figure 1.

Figure 3 is a top plan view, with parts broken away, of a standardized bar coated with a uniformly brittle film.

Figure 4 is a transverse cross sectional view along the line IV—IV of Figure 3.

Figure 5 is a top plan view, with parts broken away, of a rigid article to be tested coated with a uniformly brittle film.

Figure 6 is a top plan view of a standardized steel bar coated with a uniformly brittle film and subjected to predetermined stresses in the device of Figures 1 and 2.

Figure 7 is a top plan view of a receptacle for the bar shown in Figure 6 provided with numerical indicia indicating the magnitude of the stresses effected in the bar by the device of Figures 1 and 2.

Figure 8 shows a fragmentary top plan view of the bar of Figure 6 as mounted in the receptacle of Figure 7.

Figures 9 to 12, inclusive show top plan views of the coated article to be tested of Figure 5 as affected by progressively increasing loads.

As shown on the drawings:

In Figures 1 to 4 the reference numeral 10 indicates a resilient steel bar of standardized dimensions coated with a continuous adherent film 11 whose cracking characteristics in response to stresses are not affected by local variations in film thickness. In Figures 1 and 2, the reference numeral 20 indicates generally a calibrating device for subjecting the bar 10 to a predetermined deformation. In Figure 5, the reference numeral 40 indicates an article to be tested coated with an adherent continuous uniformly brittle film 41.

According to this invention, the steel bar 10 and the article 40 to be tested are coated at the same time and under the same moisture and temperature conditions with a film forming composition comprising, for instance, a solution of one part by weight of an extremely brittle resin, such as a highly limed wood rosin, in two parts of a volatile unitary solvent, such as carbon disulfide, this solution being plasticized, for instance, with dibutyl phthalate, to an extent just sufficient to prevent crazing of the film formed by said composition. The film forming composition should be allowed to dry for at least 6 hours. During drying and testing the temperature should not vary more than 5° F. The humidity ordinarily remains practically constant.

The calibrating device 20 comprises an elongated flat frame 21 provided with a longitudinal reinforcing rib 22 extending along one margin of said frame. This margin is expanded laterally in one portion of the frame. The corresponding end portion 22a of the rib is deflected and then offset in the direction of said expansion and terminates, short of the end of the frame, in a bearing pedestal 23 also supported by a short transverse extension 22b of said rib. A vertical guide member 24 projects inwardly over the frame 21 from the bearing pedestal in front of the extension 22b.

A shaft 25 rotatably carried by the bearing pedestal projects inwardly as far as the guide 24 and has a round disk 26 eccentrically mounted on this end. The shaft portion 25a journalled in the pedestal is constricted, the whole shaft being held against axial movement by a nut 27 and washer 28. A deflection lever 29 is affixed to the cam disk 26 by means of a projection 30. Movement of this lever in the direction of the arrow lowers the cam disk along the edge of the guide 24 to the position shown in dotted lines.

The other end portion of the frame 21 carries a box-like head comprising a transverse terminal wall 31, longitudinal marginal walls 32, a cover member 33 and a transverse front wall 34 terminating short of the cover member 33 at a height slightly lower than the top of the guide 24. Set screws 35 and 36 are disposed, respectively, in the rear wall 31 and cover 33.

When testing according to this invention, the coated bar is placed in the calibrator, coated side up, as shown in full lines in Figure 1. The cam deflection lever 29 being pulled all the way back, the bar or strip is brought under the cam 26 and pushed all the way back against the set screw 35 in the rear and over against the guide 24. The set screw 36 on top of the head is adjusted until the outer end of the bar or strip 10 is raised to just touch the under surface of the cam. The cam deflection lever 29 is then pulled fully forward into the position shown in Figure 1 in dotted lines, the bar or strip 10 being bent in the manner of a cantilever beam, as also shown in dotted lines in Figure 1. The lever is kept in this position for about 10 seconds and then put back. The set screw 36 is again adjusted so that the strip 10 just touches the cam 26 and the loading and release is repeated. This operation may be repeated again if it is thought necessary to insure the elimination of loose material from under the working parts.

The appearance of the bar after such loading is shown in Figure 6. Past a certain point back of which the bar has not been bent enough to effect the minimum strains necessary to crack the film, the brittle film is traversed by numerous cracks 12 that are spaced more or less regularly in proportion to the magnitude of the strains effected in the various areas by the bending. This relationship between regularity of spacing and strain magnitude obtains up to a maximum strain value at which the cracks are spaced by distances roughly equal to five times the thickness of the film. At this point a "full crack pattern" is said to be formed, and further increased loading does not again cause additional cracking until a second minimum strain value is reached.

The exact strain effected in each separate part of the bar may be calculated. To permit direct reading off of stress values by matching crack patterns in tested articles with the crack patterns in the various areas of the stressed bars, the latter may be inserted in receptacles such as that generally indicated by the reference numeral 50 in Figure 7. This receptacle comprises an elongated hollow frame 51 open at one end and having a window 52 for exposing the cracked film together with a set screw 53 for holding the stressed bar after insertion through the open end of the frame. Numerical indicia 54 indicate the absolute values of the strains effected in the bar by the bending and form a scale on which the magnitude of stresses effected in tested articles may be read directly by matching the crack pattern on the tested article with a crack pattern on the stressed bar.

Figure 8 shows a section of a stress scale formed by a stressed bar and a receptacle. Figures 9 and 12 show the appearance of the article of Figure 5 as subjected to longitudinal loads of, respectively, 5,000, 9,000, 14,000 and 20,000 pounds, at about the same time and under the same moisture and temperature conditions as the stressing of the bar in the scale of Figure 8. As shown, the film 41 is traversed by cracks 42. Figure 9 represents the minimum strain value necessary to cause initial crack formation around the hole. Figure 11 shows a full crack pattern around the hole. In Figure 12, the full crack pattern has expanded to include a major part of the general section of the article. By matching the appearance of the successive crack patterns in the article with those in the scale, the strain value at the edge of the hole under a load of 5000 pounds is estimated at 0.0007 inch per inch, while the strain on the general section distant from the hole is estimated at 0.0008 inch per inch under a load of 20,000 pounds. Such matching of crack patterns in respect to degree of regularity of spacing of cracks permits estimates of absolute strain values within 15 per cent.

After the test has been completed, the data obtained can be further compared by interpolating or extrapolating by simple proportion all the values of strain to one load value. The strain at the hole, for instance, at 10000 pound load is 0.0014 inch per inch while at the same load the strain on the general section distant from the hole is 0.0004 inch per inch. The strain concentration around the hole is therefore $0.0014/0.0004$ or 3.5 times greater than that of the general section.

I have therefore disclosed a method of measuring absolute stress values in rigid articles directly that may generally be said to comprise coating both an article to be tested and a standardized rigid member with like uniformly brittle films under the same conditions, subjecting said coated article and rigid member, also under the same conditions, respectively, to successively increased loads and to known deformation that varies in known manner as between various areas of said member, and estimating the magnitude of strains effected in the tested article by matching the crack patterns in the tested article with crack patterns in the rigid member, the magnitude of the strains effecting the latter crack patterns being known. This invention, in other words, provides methods and means for calibrating the brittleness of a uniformly brittle film under any given humidity and temperature conditions including means and methods for effecting a series of successively increasing strains of known magnitude in said brittle film.

It should be understood that various details of method, construction and composition may be varied within a wide range without departing from the principles of this invention. It is therefore not my invention to limit the patent granted on this invention otherwise than necessitated by the scope of the appended claims.

I claim as my invention:

1. Method of determining strain values in a rigid article comprising coating said rigid article and another rigid article with like uniformly brittle films, subjecting said second rigid article to known strains that vary as between different areas thereon to form over said areas crack patterns typical of the known strain value obtaining over each area, subjecting said first rigid article to strains sufficient to induce cracking of the film coating said second article, and matching crack patterns in said first article with crack patterns in said second article typical of known strain values, thereby estimating the magnitude of the strains effecting the crack patterns in said first article.

2. Method of determining strain values in a rigid article comprising coating said rigid article and an elongated rigid bar with like uniformly brittle films, deforming said bar resiliently in the manner of a cantilever beam, thereby effecting known strains in said bar that increase progressively along the length of the bar and forming successive crack patterns typical of said successively increasing strains, providing numerical indicia along the length of said bar indicating the magnitudes of the strains effected in the bar and forming a scale of increasing strain values, subjecting said article to strains sufficient to cause the formation of crack patterns in the film coating said article, and reading directly on said scale the magnitude of the strains effected in said article by matching crack patterns formed in said article with crack patterns in said scale.

3. A scale for reading directly the magnitude of strains effected in a rigid article coated with a uniformly brittle film, said scale comprising an elongated member coated with a like film, presenting a series of crack patterns arranged successively along the length of said member, each pattern being typical of one of a series of successively increasing strain values, and numerical indicia disposed successively along the length of said member beside said patterns, each indicium indicating the numerical magnitude of the strain value typified by the crack pattern beside which said indicium is disposed.

4. A method of making a scale for reading directly the magnitude of strains effected in a rigid article coated with a uniformly brittle film, said method comprising coating a rigid member with a like uniformly brittle film, effecting known strains in said member that increase progressively along one dimension of said member and form a series of crack patterns typical of said strains, and disposing on said member along said dimension a series of numerical indicia indicating the absolute value of said strains.

5. A method of making a scale for reading directly the magnitude of strains effected in a rigid article coated with a uniformly brittle film, said method comprising coating an elongated rigid bar with a like uniformly brittle film, resiliently bending said bar in the manner of a cantilever beam to effect simultaneous strains that increase progressively in value along the length of said bar and form a series of crack patterns each typical of the strain value obtaining over the area covered by said pattern, and providing beside each pattern a numerical indicium indicating the absolute strain value typified by said pattern.

6. A scale for reading directly the magnitude of strains effected in a rigid article coated with a uniformly brittle film, said scale comprising an elongated rigid strip coated with a like film presenting a series of successive crack patterns arranged along the length of said strip, each pattern typifying one of a series of successively increasing strain values, an elongated hollow frame enclosing said strip and having a window exposing said crack patterns and a series of numerical indicia on said frame arranged along the length thereof, each indicium indicating the strain value typified by the crack pattern exposed beside said indicium.

7. A method of determining the absolute value of strains in a rigid article comprising coating said article and a rigid member with like uniformly brittle films, deforming said member to effect simultaneous strains that increase successively in value along one dimension of said member and form a series of crack patterns each typifying the strain value obtaining over the area covered by said pattern, providing beside each pattern a numerical indicium indicating the absolute strain value typified by said pattern, deforming said article to form crack patterns in the film coating said article, matching the crack patterns formed on said article with crack patterns on said member, and reading off the numerical value typified by the matched crack patterns.

8. A method for determining the absolute value of strains in a rigid article comprising coating said article and a rigid member at substantially the same time with a composition capable of drying to form uniformly brittle films sensitive to changes in humidity and temperature conditions, allowing said composition to dry for substantially the same length of time on said article and on said member, deforming said member to effect simultaneous strains that increase successively in value along one dimension of said member and form a series of crack patterns each typifying the strain value obtaining over the area covered by said pattern, providing beside each pattern a numerical indicium indicating the absolute strain value typified by said pattern, deforming said article to form crack patterns in the film coating said article, matching the crack patterns formed on said article with crack patterns on said member, reading off the numerical value typified by the matched crack patterns, and maintaining throughout all said steps substantially the same humidity and temperature conditions.

GREER ELLIS.